Figure 1:
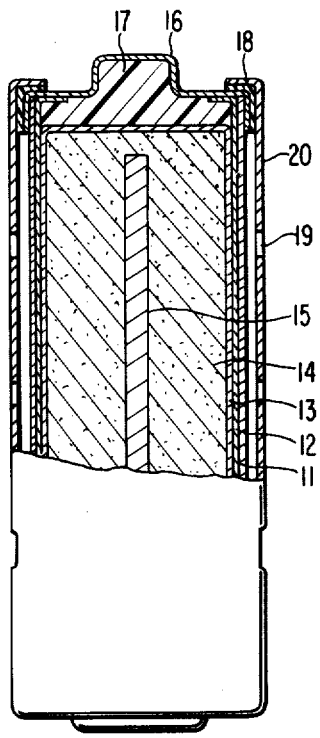

United States Patent

Tuburaya

[11] 4,054,725
[45] Oct. 18, 1977

[54] CELL UTILIZING ATMOSPHERIC OXYGEN AS DEPOLARIZER

[75] Inventor: Yoshitane Tuburaya, Ibaraki, Japan

[73] Assignee: Hitachi Maxell, Ltd., Osaka, Japan

[21] Appl. No.: 364,296

[22] Filed: May 29, 1973

Related U.S. Application Data

[63] Continuation of Ser. No. 18,089, March 10, 1970, abandoned.

[30] Foreign Application Priority Data

Mar. 10, 1969 Japan .............................. 44-21279
Mar. 10, 1969 Japan .............................. 44-21280

[51] Int. Cl.² ........................................... H01M 8/06
[52] U.S. Cl. ...................................... 429/29; 429/12; 429/38; 429/40
[58] Field of Search ..................... 136/86; 429/29, 12

[56] References Cited

U.S. PATENT DOCUMENTS

| 438,998 | 10/1890 | Glew | 252/477 R X |
|---|---|---|---|
| 2,275,281 | 3/1942 | Berl | 136/86 A |
| 3,141,729 | 7/1964 | Clarke et al. | 423/594 X |
| 3,239,383 | 3/1966 | Hauel | 136/86 E |
| 3,319,635 | 5/1967 | Stahly | 423/512X |
| 3,411,951 | 11/1968 | Galteng | 136/86 C |
| 3,440,098 | 4/1969 | Stachurski | 136/86 A X |
| 3,615,839 | 10/1971 | Thompson | 136/86 C |

Primary Examiner—Allen B. Curtis
Attorney, Agent, or Firm—A. W. Breiner

[57] ABSTRACT

A cell using atmospheric oxygen as the depolarizer which is provided with a means for capture of carbon dioxide in the passage from the air inlet to the catalytic electrode whereby the air excluded carbon dioxide therefrom is supplied to the catalytic electrode. The cell shows good discharging property for a long duration.

6 Claims, 2 Drawing Figures

U.S. Patent  Oct. 18, 1977  4,054,725

INVENTOR
YOSHITANE TUBURAYA

BY

ATTORNEYS

CELL UTILIZING ATMOSPHERIC OXYGEN AS DEPOLARIZER

This is a continuation of application Ser. No. 18,089 filed Mar. 10, 1970, now abandoned.

The present invention relates to an improvement in a cell utilizing atmospheric oxygen as the depolarizer.

In a cell using an aqueous solution of alkali metal hydroxide as the electrolyte and atmospheric oxygen activated with a catalytic electrode as the depolarizer, such as air cell or fuel cell, the catalytic electrode is freely contacted with air, i.e. not only with oxygen but also with carbon dioxide. The carbon dioxide entered through the catalytic electrode into the cell is reacted with alkali metal hydroxide in the electrolyte to form alkali metal carbonate. Thus, it results in various disadvantages such as waste consumption of the electrolyte, depression on the ion conductivity, inactivation of the anode zinc and blockade of the passage for oxygen. In order to overcome these disadvantages, there have been made some proposals such as incorporation of alkaline earth metal hydroxide into the electrolyte or the anode zinc. In the case of air cell, for instance, a proposal has been made to incorporate powdery calcium hydroxide into the anode electrolyte member prepared by mixing powdery zinc with gelled alkali electrolyte. Another proposal has also been made to apply an aqueous paste of zinc hydroxide and calcium hydroxide to a grid (e.g. nickel net) and subject the resulting grid to reduction so that calcium hydroxide is made existent in the produced metal zinc member. According to these proposals, the carbon dioxide absorbed into the electrolyte is fixed as a difficultly soluble material as shown in the following equations and affords no harmful influence on the essential reactions in the cell:

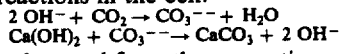
$$2 OH^- + CO_2 \rightarrow CO_3^{--} + H_2O$$
$$Ca(OH)_2 + CO_3^{--} \rightarrow CaCO_3 + 2 OH^-$$

As understood from these equations, what is materially influenced by carbon dioxide is only calcium hydroxide. Thus, the electrolyte and the anode zinc are to be not affected. Due to the production of calcium carbonate in the electrolyte member or the anode zinc member, however, the amount of the electrolyte or the anode zinc to be charged in the cell is necessarily decreased. That is, the ratio of the total quantity of electricity to the cell capacity becomes small. Moreover, the production of calcium carbonate takes place after the carbon dioxide is absorbed into the electrolyte and, therefore, carbon dioxide entered into the cell may partly cause the harmful reactions as mentioned above.

The main object of the present invention is to provide a cell which is protected from the said influences of carbon dioxide. Another object of this invention is to provide a cell showing good discharging property for a long duration.

According to the present invention, a cell using atmospheric oxygen as the depolarizer is provided with a means for capture of carbon dioxide in the passage from the air inlet to the catalytic electrode whereby the air excluded carbon dioxide therefrom is supplied to the catalytic electrode.

As the means for capture of carbon dioxide, there is used an absorptive material for carbon dioxide which consists of a thin, porous basal material and alkali metal hydroxide or alkaline earth metal hydroxide retained therein. Passing through such construction, air is made free not only from carbon dioxide but also from moisture and dust.

Practical and presently preferred embodiments of the present invention are shown in the following Examples.

EXAMPLE 1

A saturated aqueous solution of lithium hydroxide is prepared by dissolving about 18 g of lithium hydroxide in about 100 g of water at 100° C. A non-woven mat made of cellulose acetate of about 0.3 mm thick is immersed in the saturated solution. After the absorption of the solution by the mat is completed, it is taken up and dried in a dryer at about 120° C. The operations of immersing and drying are carried out repeatedly 4 times to obtain an absorptive material for carbon dioxide wherein lithium hydroxide is contained at a rate of 0.035 g/cm².

An AA type alkaline air cell incorporated with the above obtained absorptive material is shown in FIG. 1 of the accompanying drawings. In the Figure, the absorptive material 11 is doubly coiled on the outer surface of the cylindrical catalytic electrode 12 which is constructed with a basal material of porous synthetic resin film and a catalyst layer formed thereon. The anode electrolyte 14, which is the paste made by mixing zinc powder and aqueous solution of potassium hydroxide, is filled in the catalytic electrode 12 intercepted with the separator 13. The openings of the cathode side of the catalytic electrode 12 and the absorptive material 11 are inserted into the cathode seal plate 16 and fixed by the aid of the insulator 17. In the anode electrolyte 14, the collector 15 formed integrally with the anode seal plate (not shown) is inserted. All of the said parts are accomodated in the packing case 20 having the air inlet 19 and sealed intercepting with the gasket 18.

EXAMPLE 2

A dispersion of 5 g of powdery barium hydroxide in 100 ml of ethanol is applied uniformly or a polyamide fiber cloth of 100 cm² size and 0.2 mm thick to form a layer of barium hydroxide of about 0.05 g/cm². Another polyamide fiber cloth of 0.2 mm thick is covered thereon. The resulting sandwich is heated and pressed to obtain an absorptive material for carbon dioxide.

Figure 2:
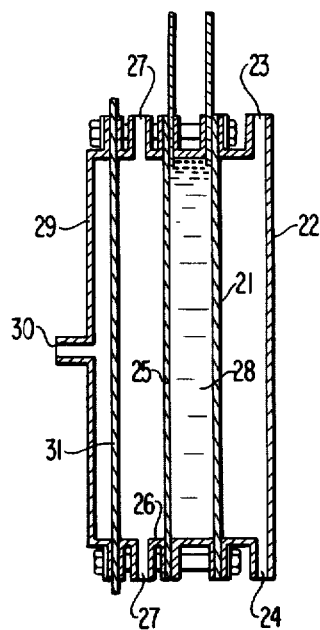

A fuel cell incorporated with the above obtained absorptive material is shown in FIG. 2 of the accompanying drawings. In the Figure, the fuel electrode (e.g. hydrogen electrode) 21 is supported by the frame body 22 provided with the hydrogen inlet 23 and the hydrogen outlet 24. The oxygen electrode 25 is supported by the frame body 26 provided with the outlet 27. In the vacancy encircled with the frame bodies 22 and 26 and the electrodes 21 and 25, an aqueous solution of potassium hydroxide as the electrolyte 28 is filled. The frame body 26 supporting the oxygen electrode 25 and the frame body 29 having the air inlet 30 retain the absorptive material 31 in an exchangeable manner.

In a cell using atmospheric oxygen as the depolarizer, 209.5 ml of oxygen at 0° C under 1 atm are theoretically required for obtaining 1 AH of the quantity of electricity irrespective of the reaction material in the anode. The said volume of oxygen is equal to about 1048 ml in terms of air. In the air cell of Example 1 hereinabove described, about 2.5 AH of the quantity of electricity can be gained when the end voltage is 0.9 volt. The amount of air required for this discharge reaction is calculated as 2620 ml. Since the content of carbon dioxide in air is usually from 0.03 to 0.04 vol%, 2620 ml of air include $1.6 \times 10^{-3}$ to $2.1 \times 10^{-3}$ g of carbon dioxide when the specific gravity of carbon dioxide is taken as about 2.0 g/l. In the cell, the absorptive material containing about 0.035 g/cm² of lithium hydroxide and being 2.7 cm × 8 cm in size is coiled doubly around the catalytic electrode. Thus, the amount of lithium hydroxide in the absorptive material is 0.76 g. As the theoretical amount of lithium hydroxide to be reacted with $1.6 \times 10^{-3}$ to $2.1 \times 10^{-3}$ g of carbon dioxide is $1.74 \times 10^{-3}$ to $2.3 \times 10^{-3}$ g, a sufficient amount of lithium hydroxide remains in the absorptive material even after the total quantity of electricity is completely discharged.

The theoretical amounts of some alkali metal hydroxide and alkaline earth metal hydroxide to be reacted with 1 liter of air including 0.04 vol% at 0° C under 1 atm are shown in the following table:

|  | LiOH | NaOH | XOH | Mg(OH)$_2$ | Ca(OH)$_2$ | Sr(OH)$_2$ | Ba(OH)$_2$ |
|---|---|---|---|---|---|---|---|
| Amount (mg) | 0.85 | 1.43 | 2.00 | 1.04 | 1.32 | 2.17 | 3.06 |

Although these materials can be employed alone or in combination for absorbing carbon dioxide, the use of lithium hydroxide, magnesium hydroxide, calcium hydroxide or barium hydroxide is particularly recommended in view of the relatively low deliquescence.

What is claimed is:

1. In an electrochemical cell using an aqueous solution of alkali metal hydroxide as the electrolyte and atmospheric oxygen activated by a catalytic cathode as the depolarizer wherein atompsheric air contacts said catalytic cathode, said cell comprising an anode in addition to said catalytic cathode and alkali metal hydroxide electrolyte retained in a housing having air inlet means for permitting atmospheric air contact with said catalytic cathode, the improvement wherein scrubber means for removing carbon dioxide from the atmospheric air are constructed and arranged between said air inlet means to said cell and said catalytic cathode whereby atmospheric air contacts are scrubber means before contacting said catalytic cathode; said scrubber means including a material which reacts with carbon dioxide to release water, and an element for retaining said material, said scrubber means being so constructed or arranged within said cell to preclude wetting out of said catalytic cathode with said water of reaction without exertion of an external pressure on the air fed to said cell or on the electrolyte of said cell.

2. The improvement according to claim 1 wherein said scrubber means is contiguous with a surface of said catalytic cathode.

3. The improvement according to claim 2, wherein the means for capture of carbon dioxide is constructed with a thin, porous basal material and at least one of alkali metal hydroxides and alkaline earth metal hydroxides retained therein.

4. The improvement according to claim 3 wherein the support material is non-woven mat.

5. The improvement according to claim 3 wherein the support material is a non-woven fabric.

6. The improvement according to claim 2, wherein the cell is a metal/air cell having a consumable anode.

* * * * *